United States Patent Office 3,528,517
Patented Sept. 15, 1970

3,528,517
ELECTRONIC WEIGHER WITH COMPONENT FAILURE INTERLOCK
Orval J. Martin, Toledo, Ohio, assignor to The Reliance Electric and Engineering Company, Toledo, Ohio, a corporation of Ohio
Filed Sept. 11, 1968, Ser. No. 759,156
Int. Cl. G01g 19/413, 23/36, 23/42
U.S. Cl. 177—4                                    5 Claims

ABSTRACT OF THE DISCLOSURE

A weighing scale comprising photosensitive means, including a plurality of photosensitive devices each of which may fail either in an electrically open or shorted condition, for making weight readings. Readout means in circuit with the photosensitive means function to indicate the weight of loads upon the scale. Interlock means prevent weight indication if one or more of the photosensitive devices fails in said open or shorted condition.

BACKGROUND OF THE INVENTION

Field of the invention

The invention relates to electrical or electronic computing and printing weighing scales which compute the values of packages of goods according to the weights of the packages and arbitrarily selected unit price factors and print tickets, labels or the like bearing such computed values and selected prices together with net weights, dates, store codes, commodity names, and commodity grades.

Description of the prior art

U.S. application Ser. No. 713,833 filed Mar. 18, 1968 in the name of Orval J. Martin discloses an electronic computing scale in which selected unit price factors are entered into the scales computer either by manually operated selector switches or by photosensitive means. A burned out (open) photocell in the photosensitive means is detected by an interlock.

SUMMARY OF THE INVENTION

Specifically, the invention envisions an interlock for blocking weight indications, either visual displays or printing, or computing, if one or more of the weight readout photocells fail either by burning out (open) or by shorting.

The objects of this invention are to improve electrical and electronic weighing scales and to provide an interlock guarding against improper operation in such scales in the event that one or more weight readout photocells fail in either an open or shorted condition.

DESCRIPTION OF THE PREFERRED EMBODIMENT

Figure 1:
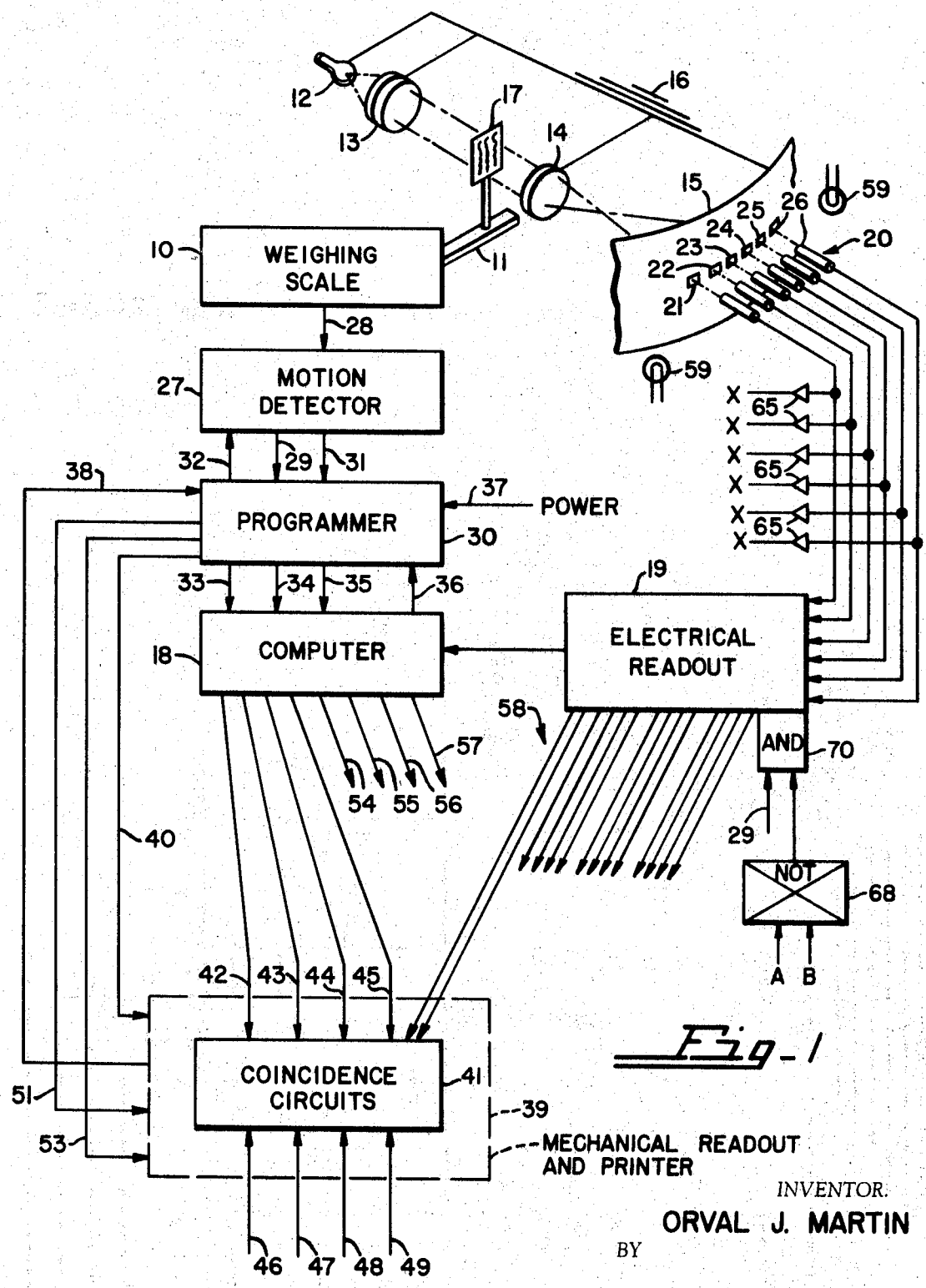
FIG. 1 is a schematic diagram illustrating the general organization of an electrical weighing, computing and printing system with photosensitive means for making weight readings.

Referring to FIG. 1, a computing weighing scale 10 includes a lever 11 and an optical projection system which diagrammatically includes a light source 12, a condensing lens 13, a projection lens 14 and a photocell mask 15. The light source 12, the lenses 13 and 14, and the mask 15 are connected to ground as shown at 16 (e.g., base of weighing scale), the mask 15 being rigidly mounted with respect to the projection optics. A coded chart 17 is moved by the load-responsive lever 11 in the optical projection system, the chart 17, hence, being condition responsive. The computer 18 which is disclosed in the U.S. application Ser. No. 439,751 filed Mar. 15, 1965 in the name of William C. Susor receives weight information from the scale and multiplies the weight of an article upon the scale by the unit price of such article to compute the value of such article. The computer 18 also multiplies such unit price times one so that it can produce a unit price output. The computer 18 has a weight input which is compatible with the parallel 1–2–4–8 binary coded decimal output of an electrical readout 19 in circuit therewith.

The chart 17 has a matrix of coded markings arranged in vertical bands so that the relative position thereof may be read by a bank of weight readout photocells 20, with one cell being associated with each column, providing an indication of the weight upon the scale. The output of the photocells is applied to the electrical readout 19, which makes available weight information to the input of the computer 18 and to a mechanical readout and printer 39 through leads 58. The mask 15 is shown as being slitted at 21–26 so that a small and clearly defined portion of the projected image of the chart 17 is permitted to fall on each of the sensitive grids of the photocells, i.e., the mask screens out unwanted chart bits (the projection lens 14 projects all of the bits in its field of view). There is a total of fourteen photocells in the photocell bank 20, only six of the fourteen photocells being shown for the sake of simplicity. Fourteen photocells are enough to read out a chart capacity of 25.00 pounds.

The weighing scale 10 is connected operatively to a motion detector 27 through a connection 28 which prevents erroneous weight readouts from taking place when the weighing mechanism is in motion. The motion detector 27 applies no motion signals through a lead 29 to a programmer 30 which is disclosed in U.S. Pat. No. 3,384,193, issued May 21, 1968 in the names of W. C. Susor and O. J. Martin. The motion detector 27 also applies motion signals through a lead 31 to the programmer 30 and receives conditioning signals from the programmer 30 through a lead 32.

The programmer 30 applies reset signals and command to compute signals through leads 33, 34 and 35, respectively, to the computer 18 and receives program advance signals through a lead 36 from the computer 18. The programmer 30 also receives power on signals through a lead 37 and coincidence check signals through a lead 38. The coincidence check signals indicate that the computer 18 and the read out positions of the number wheels in the mechanical readout and printer 39 agree. The programmer 30 also applies a signal through a lead 40 to the mechanical readout and printer 39 commanding it to print.

The programmer 30 is used in conjunction with a mechanical readout which is disclosed in U.S. application Ser. No. 416,526 filed Dec. 7, 1964 in the name of C. E. Adler. The mechanical readout is used in conjunction with a printer that is disclosed in U.S. Pat. No. 3,334,583 issued Aug. 8, 1967 in the name of Clarence E. Adler. The mechanical readout includes a combination of a series of modules each comprising a detent wheel which is directly gear connected to a commutator and to a print wheel. Each module indicates the digits of a particular denominational order. When the turning print wheel approaches the correct indicating position, a stopping latch intercepts the correct one of the teeth of the detent wheel to arrest the detent wheel. Such readout also includes coincidence circuits 41 which receive 1–2–4–8 binary coded unit price signals from the computer 18 through leads 42–45 and 1–2–4–8 binary coded decimal signals through leads 46–49 indicative of the positions of the commutators. The detent wheels and thus the print wheels are stopped when the coincidence circuits determine that the wheels are in the correct indicating positions. The readout also includes a solenoid which when it receives a signal through a lead 51 permits a new reading to be made and a solenoid which when it receives a signal through a lead 53 unlocks the unit price indicating modules which otherwise remain locked to accomplish repeat printing without recycling such unit price indicating modules. Similarly, the coincidence circuits 41 receive 1–2–4–8 binary coded decimal value signals from the computer 18 through leads 54–57 and 1–2–4–8 binary coded decimal signals through leads not shown indicative of the positions of the commutators.

Similarly, the coincidence circuits 41 receive 1–2–4–8 binary coded decimal weight signals from the electrical readout 19 through the leads 58. Since the chart capacity is 25.00 pounds there are fourteen leads 58 one for each of the fourteen weight readout photocells 20 (only six shown in FIG. 1). Twelve photocells are used for the units, tenths and hundredths weight places and only two photocells are used for the tens weight place because a two in that place is the highest possible number in such place. The coincidence circuits 41 also receive 1–2–4–8 binary coded decimal signals through leads not shown (similar to leads 46–49) indicative of the positions of the weight commutators. Three wheels print unit price ($9.99 capacity), four wheels print computed value ($99.99 capacity), and four wheels print weight (25.00 pounds capacity).

Although the various logic circuits mentioned herein are in common use in the electronic control field, a brief description of the function of each circuit is as follows. An AND logic circuit produces an output signal when, and only when, all of a plurality of input signals are present. A NOT logic circuit produces an output signal at all times unless an input signal is present. A MEMORY logic circuit sometimes known as a flip flop or bistable circuit has "ON" and "OFF" or reset input terminals, and "ON" and "OFF" output terminals. The MEMORY or bistable circuit produces an "ON" output signal in response to a signal applied at the "ON" input terminal and continues to produce the "ON" output signal, even though the input signal at the "ON" input terminal is removed, until a signal is applied to the "OFF" input terminal. The MEMORY circuit will then be turned "OFF" and produce an "OFF" output signal even though the signal at the "OFF" input terminal is removed. The MEMORY circuit will revert to its initial state upon application of a signal to the "ON" input terminal. An OR logic circuit produces an output upon receiving an input signal at any of a plurality of input terminals. For further details on the construction and operation of various types of logic circuits reference is made to an article entitled "Static Switching Devices," by Robert A. Mathias, in Control Engineering, May 1957. All of the logic circuits mentioned hereinafter are of conventional type.

Figure 2:
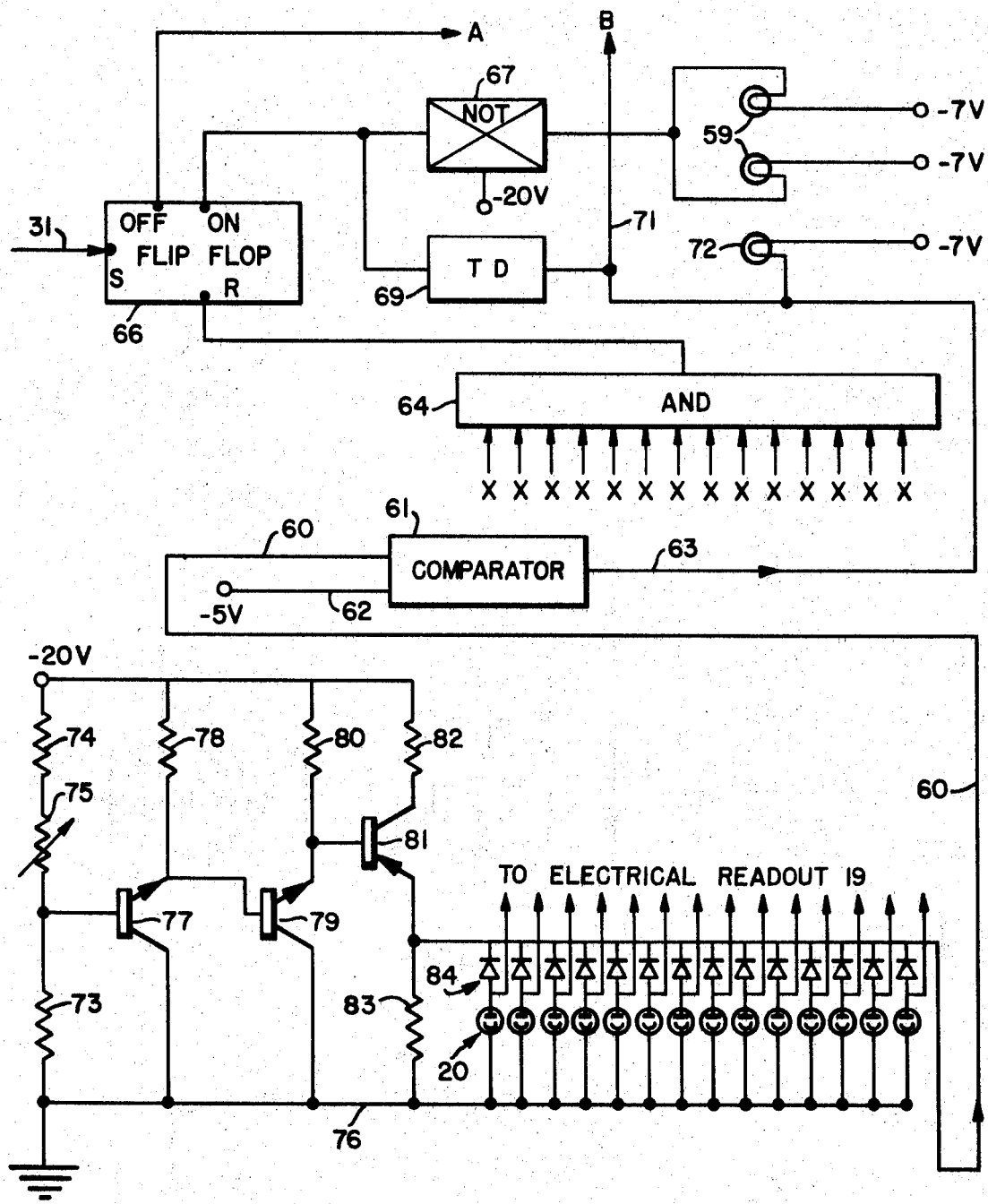
FIG. 2 is a diagram of interlock circuits for preventing weight indication if one or more of the photocells shown in FIG. 1 fails in either an open or shorted condition.

The purpose of the photocell check or interlock circuit shown in FIG. 2 is to monitor for an open or shorted photocell 20. A shorted photocell does not necessarily mean that the, for example, 2000 ohms normal resistance of the photocell goes to zero but the resistance of a shorted photocell is considerably reduced, e.g., to 100 ohms. The photocells 20 are checked for an open failure by energizing two lamps 59 which by their illumination turn on all the photocells 20 if there are no open failures. When all the photocells 20 indicate on, the lamps 59 turn off and computing, and unit price, computed value and weight indicating, e.g., printing, is permitted. A shorted photocell 20 reduces the voltage applied on an input lead 60 to a voltage comparator 61. A reference voltage is applied as an input to the voltage comparator 61 on a lead 62. An output signal on a lead 63 from the voltage comparator 61 means at least one photocell 20 is shorted. Computing, and unit price, computed value and weight indicating, e.g., printing, is prevented.

An AND gate 64 (FIG. 2) has fourteen inputs one from each of the amplifiers 65 (FIG. 1) which amplify the signals from the photocells 20 (X's in FIG. 1 connected to X's in FIG. 2) and has its output connected to reset terminal R of a flip flop 66. A motion signal on the lead 31 (FIGS. 1 and 2) applied to the set terminal S of the flip flop 66 sets the flip flop. The set flip flop 66 with its ON output turns NOT gate 67 (FIG. 2) on and with its OFF output turns NOT gate 68 (FIG. 2) off (A and B in FIG. 1 connected to A and B in FIG. 2) and with its ON output starts a time delay circuit 69 running. After a delay the time delay circuit produces an output. On NOT gate 67 turns on the lamps 59 which then are connected between −7 volts and −20 volts as shown in FIG. 2. The lit lamps 59 illuminate the fourteen readout photocells 20. The output of the time delay circuit 69 is applied through the lead 71 to also keep the NOT gate 68 off and to light failure lamp 72. When NOT gate 68 is turned off, it removes its output from one of the two inputs of an inhibit AND gate 70 which partially is enabled by no motion signals on a lead 29. The AND gate 70 when enabled permits operation of the electrical readout 19 of which it forms a part.

If all fourteen photocells 20 are on, the output from the AND gate 64 resets the flip flop 66. Every motion signal on the lead 31 triggers this automatic check, i.e., the check lamps 59 always come on and then go off if all of the photocells function properly. The reset flip flop 66 also turns NOT gate 67 off, turns NOT gate 68 on, and removes the input to the time delay circuit 69 which resets without ever turning on the failure lamp 72 or putting out an output to NOT gate 68. Off NOT gate 67 turns off the check lamps 59. On NOT gate 68 reapplies its output to the AND gate 70 permitting the electrical readout 19 to operate whenever there is a no motion signal on the lead 29.

If one or more of the fourteen photocells 20 is burned out (open), one or more of the inputs to the AND gate 64 is absent resulting in the set flip flop 66 maintaining the check lamps 59 and the failure lamp 72 energized (comes on after the time delay), and maintaining the two inputs to the NOT gate 68 resulting in disabling of the inhibit AND gate 70 and, thus, preventing operation of the electrical readout 19. No weight signals then are applied either to the computer 18 or to the mechanical readout and printer 39.

The reference voltage applied as an input to the voltage comparator 61 on the lead 62 is, for example, −5 volts. The variable voltage applied as an input to the voltage comparator 61 on the lead 60, for example when there are no shorted photocells, is −6 volts. The −6 volts is produced by a voltage divider which includes two resistors 73 and 74 and a variable resistor 75 connected between a −20 volts supply and ground. The variable resistor 75 is adjusted to place −6 volts on the lead 60, the fourteen readout photocells 20 being connected between the lead 60 and a lead 76 which is connected to ground. A shorted photocell causes the normal −6 volts to move up toward ground. The voltage comparator 61 which, for example, is a Schmitt trigger, is adjusted to produce an output on the lead 63 when the variable voltage on the lead 60 reaches −5 volts equal to the reference voltage of −5 volts on the lead 62. An output from the voltage comparator 61 means that a short has occurred in at least one photocell. The output lead 63 is connected to the lead 71 to control the NOT gate 68 in the same manner as the flip flop 66 controls the NOT gate 68 and also is connected to control the failure lamp 72. That is, an output from the voltage comparator 61 lights the failure lamp 72 and turns the NOT gate 68 off which when off removes its output from one of the two inputs of the AND gate 70 to prevent operation of the electrical readout 19.

The voltage divider is connected between resistors 73 and 75 to the base of a transistor 77 having its emitter connected through a resistor 78 to the —20 volts supply and to the base of a transistor 79, the collector of the transistor 77 being connected to ground. The emitter of the transistor 79 also is connected to the —20 volts supply through a resistor 80 and its collector also is connected to ground. The emitter of the transistor 79 also is connected to the base of a transistor 81, the collector of the transistor 81 being connected through a resistor 82 to the —20 volts supply and the emitter of the transistor 81 being connected to ground through a load resistor 83. Resistors 78 and 80 develop the voltage applied to the bases of the transistors 79 and 81, respectively, and resistor 82 functions to limit current to the collector of the transistor 81. Transistors 77, 79 and 81 always are on. A dead short in a photocell 20 would drop the normal —6 volts on the lead 60 to zero and, therefore, a shorted photocell 20 causes the normal —6 volts to move toward zero. Diodes 84, which have nothing to do with the check circuit, gate the electrical readout 19 on whenever a weight reading is to be made.

It is to be understood that the above description is illustrative of this invention and that various modifications thereof can be utilized without departing from its spirit and scope.

Having described the invention, I claim:

1. An electronic weighing scale comprising, in combination, photosensitive means for making weight readings, the photosensitive means including a plurality of photosensitive devices each of which may fail either in an electrically open or shorted condition, readout means in circuit with the photosensitive means for indicating the weight of loads upon the scale, and interlock means for preventing weight indication if one or more of the photosensitive devices fails either in said open or shorted condition.

2. An electronic weighing scale according to claim 1 wherein the interlock means is in circuit with and inhibits operation of the readout means.

3. An electronic weighing scale according to claim 1 wherein the interlock means includes error indication means operable upon failure of one or more of the photosensitive devices.

4. An electronic weighing scale according to claim 1 wherein the interlock means includes circuit means for checking the photosensitive devices for an open failure and additional circuit means for checking the photosensitive devices for a shorted failure.

5. An electronic weighing scale according to claim 1 wherein the interlock means includes circuit means for checking the photosensitive devices for a shorted failure, the circuit means including a voltage comparator, first input means for applying a reference voltage to the comparator, and second input means for applying a voltage to the comparator which varies from a set point upon occurrence of said shorted failure, the comparator producing an output indicating that at least one said shorted failure has occurred.

References Cited
UNITED STATES PATENTS 3,453,422    7/1969    Susor    177—3 XR
3,459,272    8/1969    Susor    177—4

ROBERT S. WARD, Jr., Primary Examiner

U.S. Cl. X.R.

177—25